(12) United States Patent
Chang et al.

(10) Patent No.: US 7,960,180 B2
(45) Date of Patent: Jun. 14, 2011

(54) METHODS AND APPARATUS TO CAPTURE AND RELEASE MICROBE PARTICLES USING AMINO-FUNCTIONALIZED SILICA

(75) Inventors: Hsueh-Chia Chang, Granger, IN (US); Zilin Chen, Wuhan (CN); Fu-Chih Hsu, Granger, IN (US); David Battigelli, Granger, IN (US)

(73) Assignees: University of Notre Dame Du Lac, Notre Dame, IN (US); Scientific Methods, Inc., Granger, IN (US)

( * ) Notice: Subject to any disclaimer, the term of this patent is extended or adjusted under 35 U.S.C. 154(b) by 324 days.

(21) Appl. No.: 12/033,705

(22) Filed: Feb. 19, 2008

(65) Prior Publication Data
US 2008/0237134 A1 Oct. 2, 2008

Related U.S. Application Data

(60) Provisional application No. 60/902,199, filed on Feb. 20, 2007.

(51) Int. Cl.
*G01N 30/02* (2006.01)
(52) U.S. Cl. ................. 436/161; 436/63; 435/5
(58) Field of Classification Search .................. None
See application file for complete search history.

(56) References Cited

U.S. PATENT DOCUMENTS

| | | | |
|---|---|---|---|
| 3,488,922 A | 1/1970 | Kirkland | |
| 3,677,938 A | 7/1972 | Le Page et al. | |
| 4,131,542 A | 12/1978 | Bergna et al. | |
| 5,670,631 A | 9/1997 | Bayerl et al. | |
| 5,958,677 A | 9/1999 | Lee et al. | |
| 6,027,945 A | 2/2000 | Smith et al. | |
| 6,383,393 B1 * | 5/2002 | Colpan et al. | 210/656 |
| 6,468,733 B2 | 10/2002 | Nur et al. | |
| 6,838,005 B2 | 1/2005 | Tepper et al. | |
| 6,994,971 B1 | 2/2006 | Straume et al. | |
| 2005/0242041 A1 | 11/2005 | Cumberland | |

OTHER PUBLICATIONS

Kiselev, A. V. et al. "Chromatography of proteins and viruses on macroporous silica modified with carbohydrates." Chromatographia (1984) 18 p. 69-72.*
Abbaszadegan, Morteza et al. "Detection of enteroviruses in groundwater with the polymerase chain reaction." Applied and Environmental Microbiology (1993) 59 p. 1318-1324.*
Jin, Lei et al. "Preparation of end-tethered DNA monolayers on siliceous surfaces using heterobifunctional cross-linkers." Langmuir (2003) 19 p. 6968-6975.*
Chang, Hsueh-Chia, Zilin Chen, Fu-Chih Hsu, and David Battigelli, "Capture and release of viruses using amino-functionalized silica particles," Analytica Chimica Acta, vol. 569, Issues 1-2, May 31, 2006, pp. 76-82, Elsevier B.V., USA.
Griffin, Dale W., Kim A. Donaldson, John H. Paul, and Joan B. Rose, Pathogenic Human Viruses in Coastal Waters, Clinical Microbiology Reviews, Jan. 2003, p. 129-143, vol. 16, No. 1, American Society for Microbiology, USA.

* cited by examiner

*Primary Examiner* — Yelena G Gakh
*Assistant Examiner* — Christopher A Hixson
(74) *Attorney, Agent, or Firm* — Ladas & Parry LLP

(57) ABSTRACT

Methods and apparatus to capture and release microbe particles using amino-functionalized silica substrates are described. An example apparatus adapted to capture a microbe particle includes a silica substrate and a positively charged material to at least partially coat the silica substrate. The positive charged material includes an aminopropyl functional group.

55 Claims, 7 Drawing Sheets

APS: 3-aminopropyl-functionalized silica

EPS: (3-ethylenediamino)propyl-functionalized silica

DPS: (3-diethylenetriamino)propyl-functionalized silica

LS: Lupamin (linear polyvinylamine)-functionalized silica

METHODS AND APPARATUS TO CAPTURE AND RELEASE MICROBE PARTICLES USING AMINO-FUNCTIONALIZED SILICA

This application claims the benefit of U.S. Provisional Patent Application 60/902,199, filed Feb. 20, 2007, and entitled "Capture and Release of Viruses using Amino-Functionalized Silica Particles," which is hereby incorporated herein by reference in its entirety.

GOVERNMENT INTEREST STATEMENT

This disclosure was made, in part, with United States government support from the Environmental Protection Agency (EPA), EPA-SBIR Contract No. EP-D-05-037. The United States government has certain rights in this invention.

FIELD OF THE DISCLOSURE

The present disclosure relates generally to the capture and release of microbe particles from fluids and, more particularly, to methods and apparatus to capture and release microbe particles from fluids using amino-functionalized silica.

BACKGROUND

The contamination of water with human enteric viruses continues to present a serious threat to the public health in many countries, including the United States. Enteric viruses can cause debilitating diseases, and many outbreaks result from contaminated drinking water. For example, from 1971 to 1999, 9% of reported outbreaks of infectious diseases associated with ground water contamination were attributed to viral agents. In 1982, 73 cases of hepatitis A virus (HAV) were documented to be the result of consuming contaminated water from a single spring in Meade County, Ky. (See Bergeisen, G. H.; Hinds, M. W.; Skaggs, J. W. *Am. J. Public Health* 1985, 75, 161-164). Norwalk virus and Norwalk-like viruses (noroviruses) are regarded as major causes of foodborne and waterborne viral gastroenteritis. Outbreaks of viral gastroenteritis have been associated with contamination of water supplies, raw foods, and food products prepared by ill food handlers. In some instances, outbreaks of norovirus gastroenteritis have been linked to the failure of a septic tank system (See, Bellar M.; Ellis, A.; Lee, S H.; Drebot, M. A. et al. *JAMA* 1997, 278, 563-568).

Conventionally treated drinking water may still contain human enteric viruses and cause outbreaks even when those waters have met water quality criteria based upon coliform bacteria densities and turbidity. Furthermore, because enteric viruses are generally infectious at relatively low concentrations, the detection of virus samples in environmental waters typically requires the collection of large sample volumes such as, for example, more than 1,000 liters.

Adsorption-elution is one known method used to concentrate virus samples using large volumes of water. Adsorption-elution methods rely upon electrostatically (negatively or positively) charged microporous filters to capture virus particles. In particular, virus particles are negatively charged at pH 7.0 and adsorb to the filter as the water sample passes through the electrostatic filter. Although inexpensive, microporous filters having negatively charged materials such as nitrocellulose (Millipore HA), fiberglas (Filterite), and cellulose (Whatman) typically require extensive pre-conditioning of the water to facilitate binding interactions between the negatively charged surface material and negatively charged virus particles (See, Lukasik J.; Scott, T. M.; Andryshak, D.; Farrah, S. R. *Appl Environ Microbiol.* 2000, 66, 2914-20).

Pre-conditioning treatments of the water may include acidification of the water sample or the addition of multivalent cationic salts such as, for example, magnesium chloride or aluminum chloride to serve as bridging molecules between the negatively charged microporous filters and the negative charged viral particles to facilitate virus capture. In such pre-conditioning treatments, the addition of multi-valent cations effects a charge reversal on the negatively charged viral particles, providing for electrostatic binding interactions on the negatively charged microporous filter surface.

Alternatively, the addition of multi-valent cations with the negatively charged microporous filter provides counter-ion flux water on an ion-selective membrane (e.g., a filter), which produces a thick positively charged double layer near the membrane surface. (See, Ben, Y.; Chang, H.-C., *J. Fluid Mech.* 2002, 461, 229-238). This external double layer has a net charge higher than that of the membrane, thus effectively reversing the charge of the membrane to create a virus binding surface. However, this alternative positively charged double layer mechanism can only occur if the pores of the membrane filter are sufficiently small such that electro-osmotic flow and neutralizing convection are minimized, and only ion-selective electro-migration drives a cation flux into the membrane. As a result, negatively charged membrane filters having small pore sizes (e.g., 0.2 to 0.45 μm) often times minimize internal flow, which may severely restrict the volume of sample that can be filtered.

Electropositive microporous filters, on the other hand, have a positively charged surface that facilitate the deposition and retention of the particles on the surface of the filter media. Electropositive filters typically do not require pre-conditioning treatments of the water sample and may accommodate larger sample volumes due to their large porosity (10 μm) and extensive surface area (See Sobsey, M. D.; Jones, B. L.; *Appl. Environ. Microbiol.* 1979, 37, 588-595 and Sobsey M. D.; Glass, J. S. *Appl Environ Microbiol* 1980, 40, 201-210). However, these filters are usually unsuitable for concentration of particular viruses and are relatively more expensive. The appreciable costs of these filters, coupled with erratic recoveries for some important viral agents often times preclude their routine use.

Both the negatively and positively charged microporous filters require post-filtration process to concentrate the viral particles. Post-filtration processing rely upon the use of relatively large volumes (e.g., ~1,000 mL) of highly alkaline, protein-rich eluent, for example beef extract/glycine, that may interfere with downstream enzyme-based assay procedures such as the polymerase chain reaction (PCR) due to the high concentration of mammalian DNA in the eluents. Polymerase chain reaction (PCR) amplifies (i.e., replicates) a specific regions of a DNA strand (the DNA target) by in vitro enzymatic replication. Because PCR amplifies the regions of DNA that it targets, PCR can be used to analyze extremely small amounts of sample. PCR detects viral DNA using primers specific to the targeted sequences in the DNA of a virus and can be used for diagnostic analyses or DNA sequencing of the viral genome.

Thus, large elution volumes also typically require secondary concentration to render the sample compatible with assay procedures that rely upon mammalian cell cultures (e.g., 20-30 mL). These secondary concentration methods include, for example, organic flocculation, adsorption-elution, etc. More recently, however, alternative elution procedures relying upon defined eluents (e.g. amino acids) have been described for the recovery of nonculturable viruses from water, with encouraging reductions in assay interferences (See Hedberg, C. W.; Osterholm, M. T. *Clin. Microbiol. Rev.* 1993, 6, 199-210 and Kittigul, L.; Khamoun, P.; Sujirarat, D.; Utrarachkij, F.; Chitpirom, K.; Chaichantanakit, N.; Vathanophas, K. *Mem Inst Oswaldo Cruz.* 2001, 96, 815-21).

Ultrafiltration is another known method used to concentrate virus samples using large volumes of water. Ultrafiltration also relies on positively charged filter media for concentration of enteric viruses (Li, J. W.; Wang X. W.; Rui Q. Y.; Song N.; Zhang F. G.; Ou Y. C.; Chao F. H. *J. Virol. Methods* 1998, 74, 99-108). Ultrafiltration filters have very small pore sizes that only allow small molecules to pass through the filter and retain the viruses within the circulating sample, which is recirculated until the required sample size is reached. A small pour size filter concentrates all particles, including virus microbe particles, present in the water sample, which can minimize bias in concentration of different virus types within the sample. After the required volume is reached, an elution is used to concentrate the viral particles adsorbed onto the filter membrane.

The positively charged ultrafiltration filter may be composed of, for example, $NaCO_3$, $AlCl_3$ and silica gel (Li et al.). Recently, hollow fiber ultrafilters have been used to detect enteric viruses in a variety of water samples and recoveries in excess of 50% have been reported (Morales-Morales H. A.; Vidal, G.; Olszewski, J.; Rock, C. M.; Dasgupta, D.; Oshima, K. H.; Smith, G. B. *Appl Environ Microbiol* 2003, 69, 4098-102). However, the small pores of the filter membrane typically become blocked during filtering by organic matter in environmental water samples. Additionally, these ultrafiltration filters are relatively expensive, must be pretreated to block nonspecific adsorption onto the membrane, and samples must be recirculated through filter cartridges under pressure at relatively slow flow rates (e.g., 200-300 mL/min). These requirements make it impractical to filter large volumes of water in the field.

DETAILED DESCRIPTION

In general, the example apparatus and methods described herein provide a microbe particle capture material based upon a silica substrate at least partially coated with a positive charged material that includes, for example, an aminopropyl functional group. The capture apparatus can filter microbe particles from a fluid, such as, for example, water, and/or can manipulate concentration of microbe particles in fluid samples to render the samples compatible with assay procedures such as, for example, enzyme-based assay procedures.

In particular, an example capture apparatus adapted to capture a microbe particle includes amino-functionalized silica materials such as, for example, a plurality of beads, that can efficiently capture and/or concentrate microbe particles in a fluid such as, for example, water. In one example, an array of amino-functionalized, electropositive silica materials capture model bacterial viruses such as, for example, coliphage MS-2 and/or bacteriophage PRD-1 from water samples having a wide range of pH levels and microbe particle densities. The example amino-functionalized silica substrates described herein include 3-aminopropyl-functionalized silica ("APS"), 3-(ethylenediamino)propyl-functionalized silica ("EPS"), 3-(diethylenetriamino)propyl-functionalized silica ("DPS"), and Lupamin-coated silica ("LS"). It will be appreciated by one of ordinary skill in the art, however, that other electrostatically and/or positively charged material(s) may be utilized as well. The microbes captured on the example silica materials may be released from the silica using an elution solution that may contain soluble proteins, amino acids, and/ or surfactants as described in greater detail below.

The following examples are provided to illustrate various apparatus and methods which have been made within the scope of the present disclosure. It is to be understood by one of ordinary skill in the art that the following examples are neither comprehensive nor exhaustive of the many types of methods and apparatus which may be prepared in accordance with the present disclosure.

Figure 1A:
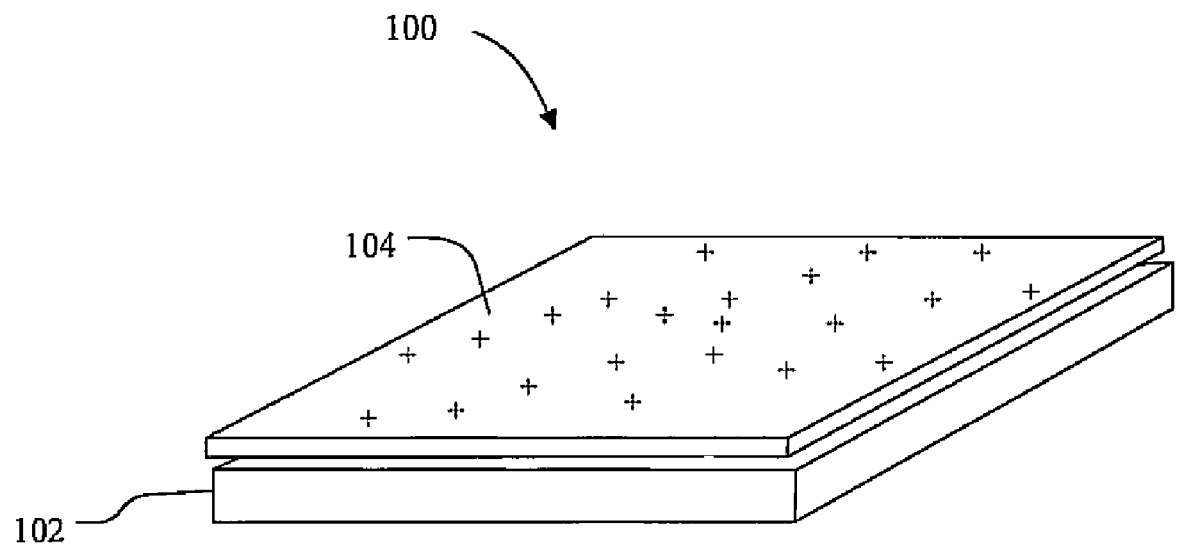
FIG. 1A is a schematic illustration of an example silica substrate functionalized with a positively charged material for capture of microbe particles.
Figure 1B:
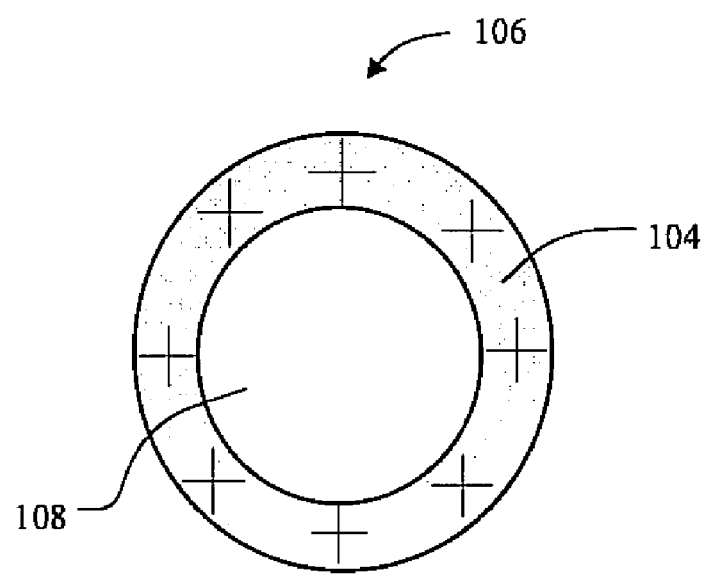
FIG. 1B is a schematic illustration of an example silica bead functionalized with a positively charged material for capture of microbe particles.

FIG. 1A illustrates an example microbe capture apparatus 100. The example apparatus 100 includes a negatively charged silica substrate 102 that is at least partially coated or functionalized with an electrostatically charged and/or positively charged material 104. In the illustrated example, the substrate 102 is a non-porous silica substrate. However, in other example implementations, the substrate 102 may be a gel, a bead, a lattice structure, and/or any other suitable substrate that can be coated with an electrostatically charged material. For example, FIG. 1B illustrates a microbe capture apparatus 106 that includes a silica bead 108 functionalized with the positively charged material 104.

In the illustrated examples of FIGS. 1A and 1B, the positively charged material 104 (e.g., APS, EPS, DPS, LS, etc.) is bonded to the silica substrate 102 and/or silica bead 108, such as, for example, a chemical process described in greater detail below. However, in other example implementations, the positively charged material 104 may be coupled to the silica substrate 102 and/or silica bead 108 via any other suitable process(es). As noted above, in this example, the positively charged material 104 includes an aminopropyl functional group such as, for example, 3-aminopropyl-functionalized silica, 3-(ethylenediamino)propyl-functionalized silica, 3-(diethylenetriamino)propyl-functionalized silica, and Lupamin-coated silica. The aminopropyl functional group has defined length spacer molecules to yield particles with a surface density that is optimized for efficient microbe particle (e.g., virus particle) capture.

Figures 2A, 2B:
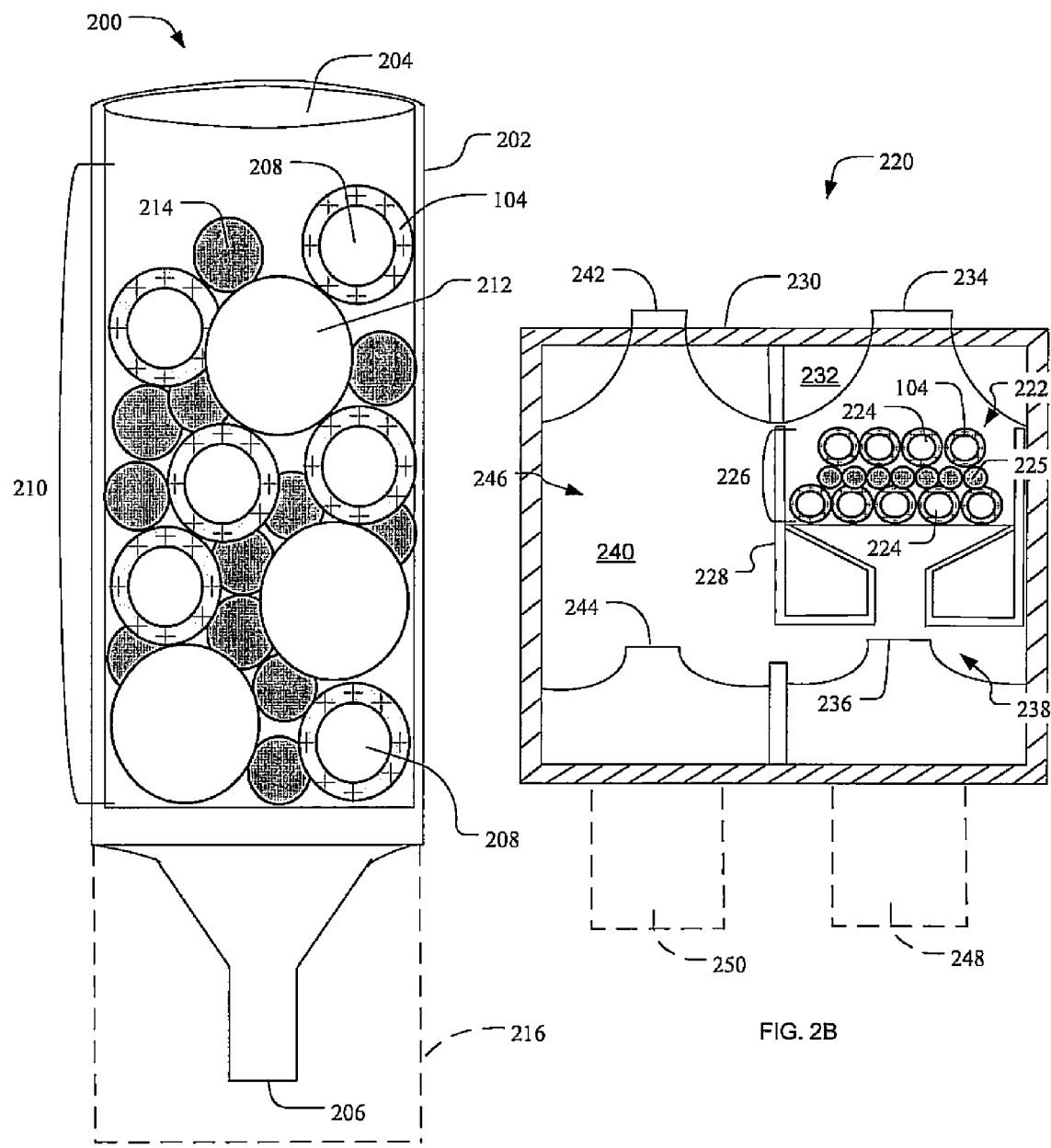
FIG. 2A illustrates an example microbe capture apparatus described herein.
FIG. 2B illustrates another example microbe capture apparatus described herein.

FIG. 2A illustrates another example microbe capture apparatus 200 described herein. The example capture apparatus 200 includes a housing 202, illustratively depicted as a column, having an inlet 204 and an outlet 206. The housing may be made of glass, plastic, stainless steel, and/or any other suitable material(s). The housing 202 may be positioned in a generally vertical or horizontal orientation, and/or any other suitable orientation(s).

In this example, a plurality of the silica beads 208 functionalized with the positively charged material 104 form a filter disposed within the housing 202 in a generally vertical manner between, and in fluid communication with the inlet 204 and the outlet 206. The example silica beads 208 are arranged in a porous array 210 such that a fluid is passable through the porous array 210 between the inlet 204 and the outlet 206. The example capture apparatus 200 may include an inert material 212 to modify and/or control the rate of flow through the capture apparatus 200. The inter material 212 may include, for example, a nonfunctionalized (i.e., a bare) silica bead having a larger diameter than the functionalized silica beads 208. Additionally or alternatively, a porous adsorbent material 214 may be arranged with the functionalized silica beads 208 and/or the inert material 212 to form the porous array 210. The porous adsorbent material 214 may be a highly adsorbent material such as, for example, granular activated carbon.

The example capture apparatus 200 filters microbe particles from a fluid such as, for example, water, or any other liquid and/or gas. Additionally, the example capture apparatus 200 may include an optional container or reservoir 216 operatively coupled to the capture apparatus 200 to capture and/or retain a fluid that exits the outlet 206 when the fluid is processed through the capture apparatus 200. In other examples, the container 216 may be removably coupled to the housing 202, or may be fluidly coupled to the outlet 206 via a hose, tube, and/or any other suitable arrangement(s). Although not illustrated, the housing 202 may include a lid to cover the inlet 204. The capture apparatus 200 may be portable and thus may be used either on site such as at the source of a water sample, or at any facility such as a laboratory.

FIG. 2B illustrates another example capture apparatus 220 which may be used to capture a microbe particle from a fluid. As shown in FIG. 2B, a silica substrate 222 includes a plurality of silica beads 224 functionalized with the positively charged material 104 (FIGS. 1A and 1B). A second material 225 (e.g., a porous adsorbent material, an inert material, etc.) may be arranged with the silica beads 224 to form a porous matrix 226 such that a fluid is passable through the porous matrix 226. In this manner, the matrix 226 may be arranged, for example, in a carrier 228 (e.g., a cartridge, a sealed unit, etc.), or any other suitable arrangement. For instance, the example capture apparatus 220 includes a housing 230 having a first portion 232 positioned between a first inlet 234 and a first outlet 236 to form a first passageway 238 through the housing 230. The first portion 232 is sized to receive at least a portion of the carrier 228 so that the matrix 226 is in fluid communication with the first inlet 234 and the first outlet 236.

The housing 230 includes a second portion 240 between a second inlet 242 and a second outlet 244 to form a second passageway 246 through the housing 230. The second portion 240 is sized to receive at least a portion of the carrier 228 so that the matrix 226 is in fluid communication with the second inlet 242 and the second outlet 244. In this manner, the carrier 228 may be selectively disposed or moved between the first portion 232 and the second portion 240 of the housing 230. The carrier 228 may be selectively moved between the first portion 232 and the second portion 240 of the housing 230 via, for example, a sliding mechanism, a rotational mechanism, and/or any other suitable mechanism(s). In another example (not shown), the first portion 232 may be located in a separate housing from the second portion 234.

In this illustrated example, the first portion 232 includes an optional first container or reservoir 248 in fluid communication with the first outlet 236. The second portion 240 of the housing 230 includes an optional second container or reservoir 250 in fluid communication with the second outlet 244. In this manner, a first fluid passes through the carrier 228 via the first inlet 234 to contact the functionalized silica matrix, exits through the first outlet 236, and is retained by the first container 248. A second fluid passes through the carrier 228 via the second inlet 242 to contact the silica matrix 226 and exits through the second outlet 244. The fluid that exits the second outlet 244 is retained by the second container 250. The containers 248, 250 may be removably coupled to the housing 230, fluidly coupled to housing 230 via for example hoses, and/or may be disposed within the housing 230 and include an outlet to remove the fluids contained therein.

In another example, a capture apparatus may include silica functionalized with a positively charged material disposed within a housing such as, for example a test tube. In such an implementation, a fluid is added to the housing so that the fluid contacts the silica. The housing is then agitated via, for example, stirring, shaking, etc., prior to the fluid being removed from the housing. A membrane, such as, for example, a screen, may be disposed within the housing to prevent the silica from exiting the housing when the sample fluid is removed. In yet another example, the silica may be removed from the test tube and transferred to a second housing, wherein an elution solution is added to the second housing to release the microbe particles from the functionalized silica to provide a concentration solution (i.e., the eluate solution containing the microbe particles) compatible with assay procedures. The concentrated solution is removed from the second housing, which may be analyzed to detect the presence of the microbe particles and/or identify a specific microbe particle type using, for example an enzyme-based procedure.

As discussed below in greater detail, the various aminopropyl materials described herein interact or bond differently with different types of microbe particles, which may facilitate or impede electrostatic attraction or other intermolecular interactions (e.g., hydrogen bonds) and/or facilitate or impede the release of captured particles from the functionalized silica. For example, the APS functionalized silica substrate typically provides greater release efficiency when releasing a coliphage PRD-1 particle than a coliphage MS-2 particle from the APS functionalized silica substrate.

Because a fluid may contain different types of microbe particles, a capture apparatus described herein may include an array of various aminopropyl functionalized silica described herein and/or silica functionalized with any other suitable positively charged materials. For example, the silica beads in the example capture apparatus 200 or 220 may include a plurality of aminopropyl functionalized silica beads functionalized with APS aminopropyl material and a plurality of silica beads functionalized with DPS aminopropyl materials, and/ or any other combination thereof (e.g., a plurality of EPS and/or LS aminopropyl functionalized silica beads). In this manner, a fluid sample having different types of microbe particles (e.g., a first viral particle different from a second viral particle) that have different capture and/or release characteristics may be used with a capture apparatus described herein having the various functionalized silica.

Figures 3A, 3B:
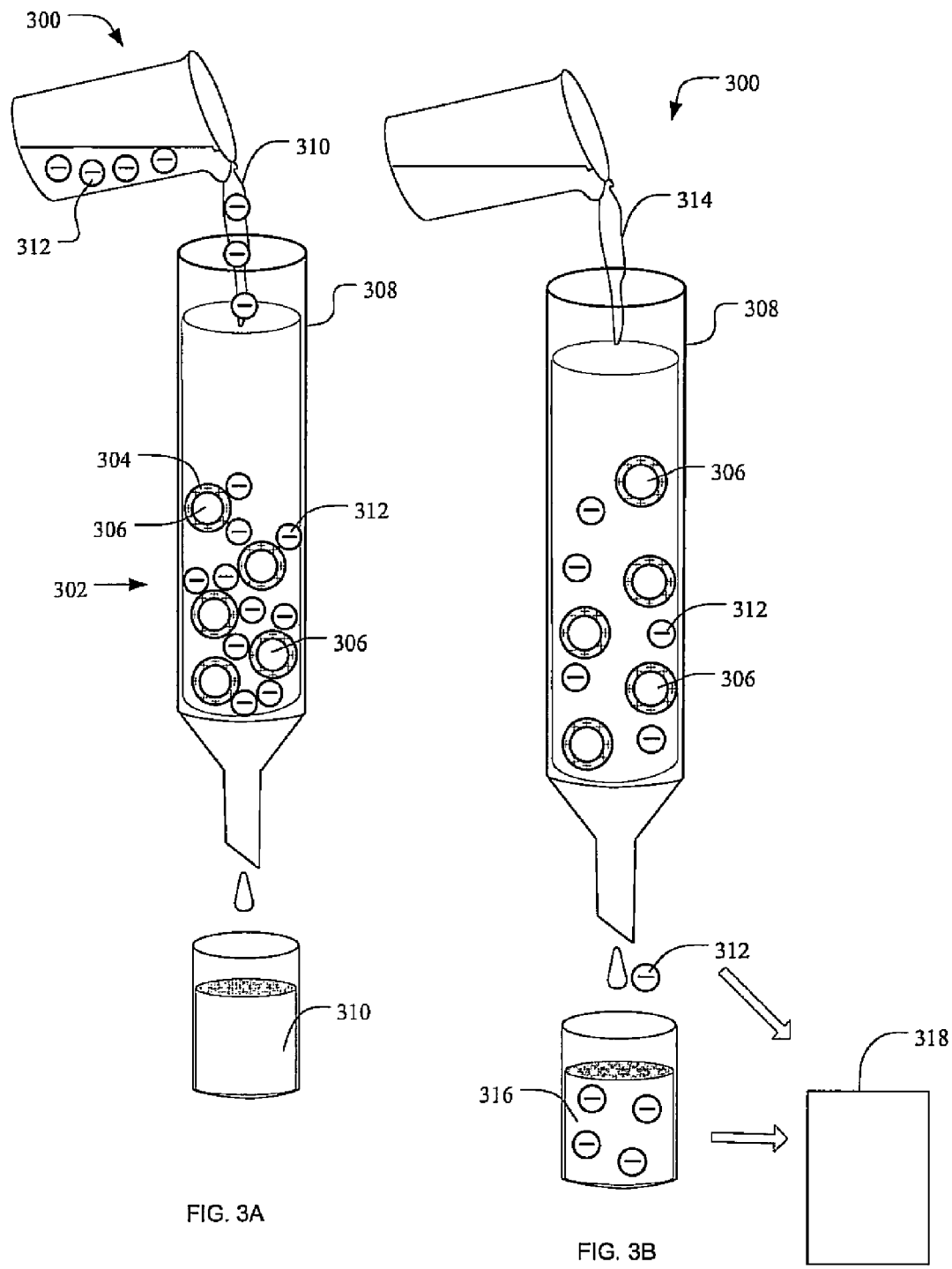
FIG. 3A is a schematic illustration of a method to capture a microbe particle using an example microbe capture apparatus described herein.
FIG. 3B is a schematic illustration of a method to release a microbe particle from an example capture apparatus described herein.

FIG. 3A is a schematic illustration of an example method to capture a microbe particle using an example capture apparatus 300. The example capture apparatus 300 includes a silica substrate 302 functionalized with an aminopropyl material 304 such as, for example, APS, EPS, DPS, LS, and/or any other suitable positively charged material(s). The functionalized silica substrate 302 includes a plurality of silica beads 306 arranged in a column 308. As described above, the column 308 may be positioned in a generally vertical or horizontal orientation and/or any other suitable orientation(s). The fluid 310 passes through the column 308 so that the fluid 310 contacts the functionalized silica beads 306, thereby filtering the fluid. Microbe particles 312 in the fluid 310 having a negative charge are captured by the functionalized silica beads 306 due to the positively charged material 304 when the fluid 310 is contacted with the functionalized silica beads 306. In other examples (not shown), the fluid 310 may contact the functionalized silica substrate 302 by passing the fluid 310 over, as opposed to through, the functionalized silica substrate 302.

FIG. 3B is a schematic illustration of an example method to release the microbe particle 312 captured by the example functionalized silica beads 306 of FIG. 3A. In particular, once the microbe particle 312 is captured by the functionalized silica beads 306 as described above, an elution solution 314 releases the microbe particle 312 from the silica beads 306. In some example implementations, the elution solution 314 includes at least one of beef extract, amino acids, surfactants or polysorbate, and/or any other suitable material(s) as described in greater detail below.

The elution solution 314 containing the microbe particle 312 provides a concentration solution 316 (e.g., an eluate solution) that is recovered from the column 308 using for example, a container, a detection device, etc. The concentrated fluid 316 is compatible with assay procedures and, thus, may be analyzed to detect the presence of microbe particles 310 using any analysis process(es) 318 such as, for example, a nucleic acid-based procedure (e.g., PCR).

Typically, an elution solution includes beef extract. However, removing the beef extract from the eluent may render the concentration solution 316 more compatible with assay-based procedures (e.g., PCR-based assay), which may otherwise be substantially inhibited due to the abundance of nucleic acids of calf origin arising from the beef extract-rich solutions. An example elution solution may include approximately 0.25 M threonine, approximately 0.5 M glycine, approximately 0.5 M lysine, approximately 0.1% cetyltrimethylammonium bromide, approximately 0.1% sodium dodecylsulfate, and approximately 0.01% polysorbate. Of course, an elution solution containing beef-extract is compatible with the apparatus and methods described herein.

Preparation of Amino-Functionalized Silica

As stated above, an amino-functionalized silica substrate (e.g., beads) described herein may be functionalized using an aminopropyl material such as, for example, 3-aminopropyl-functionalized silica (APS), 3-(ethylenediamino)propyl-functionalized silica (EPS), 3-(diethylenetriamino)propyl-functionalized silica (DPS), and lupamin-coated silica (LS). Functionalizing the silica substrate with an amino-functionalized material may be prepared according to the following reaction chemistries: drying a silica gel and adding an aminopropyl material in dry toluene to the dried silica gel; refluxing the silica gel with the added aminopropyl material under continuous stirring for a predetermined duration of time, thereby forming a functionalized silica gel; and filtering the functionalized silica gel. Functionalizing the silica gel may further include washing the functionalized silica gel with at least one of water, toluene, acetone, or methanol; and after washing the functionalized silica gel, further drying the silica gel.

For instance, the following chemistries may be used to prepare the example functionalized silica substrate of FIGS. 1-2 with APS, EPS, DPS and LS. In one example, the APS amino-modified silica is prepared with approximately six grams of silica gel such as, for example, 70-270 mesh chromatography-grade, Sigma-Aldrich, Saint Louis, Mo. The silica gel is dried at approximately 150° C. for a duration of time (e.g., overnight). The dried silica gel is then added to approximately 150 ml of (3-aminopropyl)triethoxysilane in dry toluene to form a slurry. The slurry is refluxed for approximately 20 hours, under continuous stirring. The APS amino-modified silica gels are filtered, washed with toluene, acetone, and/or methanol, and then dried at approximately 105° C. for about 4 hours and/or any other suitable temperature or duration of time.

An example EPS amino-modified silica may be prepared similar to the method of preparing the APS, except for using [3-[(2-aminoethyl)amino]propyl]trimethoxysilane in place of (3-aminopropyl)triethoxysilane.

The DPS amino-modified silica is prepared by adding approximately 6 grams of silica gel in approximately 150 mL of 3% N-3-(trimethoxysilylpropyl)diethylenetriamine in about 1 mM acetic acid. The mixture is stirred continuously for approximately 3 hours. The mixture is then filtered and washed with water and dried at approximately 105° C. for about 4 hours.

The amino-modified silica Lupamin-coated silica (LS) is prepared by mixing approximately 2 grams of silica with approximately 20 ml of 2 mg/ml polyvinylamine, and stirred for about 3 hours. The amino-functionalized silica is washed with water and dried for use.

Figure 4:
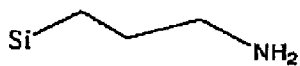
FIG. 4 is a schematic illustration of example chemical structures of amino-functionalized silica described herein.
Figure 4:
Figure 4:
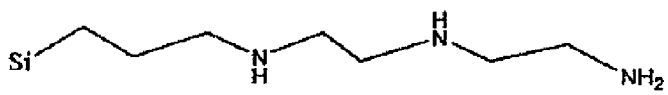
Figure 4:
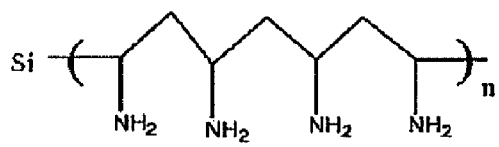

FIG. 4 illustrates a schematic representation of the chemical structures of example amino-functionalized materials (APS, EPS, DPS, and LS) as described above.

Examples

The effectiveness of the amino-functionalized silica substrates ability to capture and release microbe particles is illustrated in the examples described below. In particular, silica beads functionalized with APS, EPS, DPS and LS were prepared in duplicate groups and the first group was exposed to contaminated fluid samples containing bacteriophages MS-2 microbe particles, while the second group was exposed to fluid samples containing bacteriophages PRD-1 microbe particles. Following the capture of the MS-2 and PRD-1 microbe particles, the viruses were released from the respective functionalized silica bead groups using various types of eluents. The capture and release efficiencies for each of the APS, EPS, DPS and LS functionalized silica beads exposed to the bacteriphages MS-2 and PRD-1 are shown in tables 2 and 3 below.

Capture efficiencies were categorized as a function of the zeta potentials of the respective amino-functionalized silica beads. A zeta potential is the overall charge a particle acquires in a specific medium, such as, for example an aqueous solution. Prior to exposing the amino-functionalized silica to the contaminated fluid, the zeta potentials of the APS, EPS, DPS, and LS functionalized silica beads were measured as a function of pH conditions. Variations in pH levels alters the zeta potential, which is a factor affecting the capture efficiency of microbe particles. Thus, buffer solutions were prepared having varies pH levels and were applied to the amino-functionalized silica beads to determine the pH effect on the zeta potentials of the amino-functionalized silica substrates. The zeta potentials were used to establish an index for monitoring the density of the functionalized groups and the charge behavior of the functionalized silica surfaces. Additionally, the morphology of the silica particles was studied by scanning electron microscopy (SEM) and used to characterize the bare and functionalized silica beads.

Preparation of Bacteriophages MS-2 and PRD-1

Bacteriophages MS-2 (ATCC 15597-B1) and PRD-1 (BAA-769-B1) and *E. coli* Famp host bacteria (ATCC 700801) were purchased from the American Type Culture Collection (Gaithersburg, Md.). Bacteriophages were plaque-purified and propagated to high titer using *E. coli* host cells according to the double agar layer infectivity method described by Adams (Adams, 1959), recovered in small volumes of phosphate-buffered saline, pooled and extracted using chloroform before aliquotting samples for use throughout the project. Virus stocks and host cells were archived in 20% glycerol (vol/vol) at −70° C.

Determination of Capture and Elution Efficiency

Approximately 50 mg of silica particles with and without positively charged material functionalization were deposited into microcentrifuge tubes in duplicate and supplemented with 1 mL of bacteriophage MS-2 (approximately 100-200 plaque forming units (PFU) per unit volume). Silica/bacteriophage suspensions were vortexed every 30 seconds over a 5 minute period. The tubes were then centrifuged for 2 min at 2,000×g at 10° C., and supernatants were transferred to sterile polypropylene tubes. Pelleted beads were then supplemented with 1.0 mL of elution solution and vortexed every 30 seconds for a total 5 min, followed by centrifugation as before. The eluates were then transferred into clean sterile tubes. The supernatants and eluates were then subjected to infectivity assay (double agar layer method) to identify the number of viable viruses captured and eluted from the functionalized silica beads.

Enumerative Virus Assay

Viruses were quantified according to the double agar layer method (Adams, 1959). In brief, 0.1 to 0.5 mL of supernatant or eluate samples was added to 5 mL of molten top agar (0.9% wt/vol) containing log-phase *E. coli* host from overnight cultures and poured into 100 mm plates containing nutrient bottom agar. After 16-24 hours incubations at 37° C., clear zones of lysis (viral 'plaques') were enumerated. Virus concentrations were determined as the mean sum of plaques across duplicate plates corrected for dilution.

Measurement of Zeta Potentials and Raman Spectroscopy

A zeta potential of the amino-functionalized silica particles were measured and analyzed. The zeta potentials were used to establish an index for monitoring the density of the functionalized groups and the charge behavior of the functionalized silica surfaces. Zeta potentials of functionalized silica particles were measured with a Zeta Potential Analyzer (Brookhaven Instruments Corporation, Holtsville, N.Y.). Particles were suspended in deionized water or phosphate buffers adjusted for pH. Raman spectrometry was used for characterizing the functionalized silica surfaces. The Raman spectra of functionalized silica were measured with an in Via Raman Microscope (Renishaw, UK).

Zeta Potential, Morphology and Raman Spectroscopy Of Amino-Functionalized Silica When particles are suspended in an electrolyte solution, a layer of counter ions exhibiting a charge opposite to those on the surface form a charged double layer around the particle. The potential drop across the double layer is the Zeta potential and its magnitude and sign reflects the density and charges of the surfaces. When functionalized groups are modified on the surface of the particle, the Zeta potential can be altered because the functionalized groups change the surface charge and sometimes the thickness of the double layer due to the finite size of the functional group. Hence the Zeta potential can be used as a measure of the density of the functionalized groups.

Figure 5:
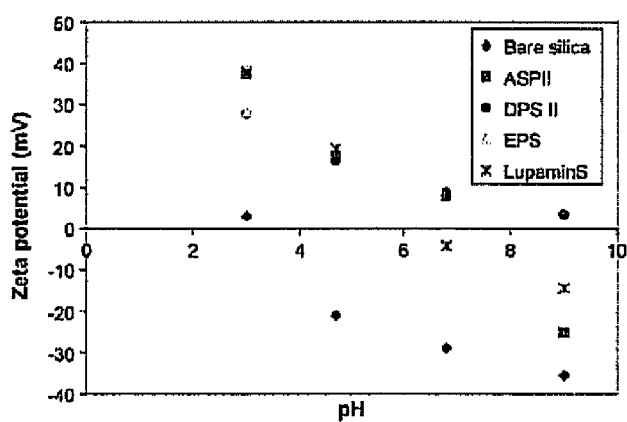
FIG. 5 is a graphical depiction of a pH effect on the zeta potentials of the example amino-functionalized silica of FIG. 5.

The Zeta potential of bare silica gel in water was measured to be −27 mV to −35 mV, which indicates that silica exhibits a negatively charged surface in water, unsuitable for virus capture unless acidic conditions are imposed to effect charge reversal. FIG. 5 is a graphical depiction of a pH effect on the zeta potentials of the example amino-functionalized silica of FIG. 4, wherein pH buffers were prepared with 10 mM phosphate buffer. Referring to FIG. 5, as depicted by the graphical representation, the zeta potentials of amino-functionalized silica particles were measured as a function of pH condition. Prior to chemical modification, bare silica shows a negative zeta potential above pH 3.0 due to the dissociation of protons from the silanol group. After chemical modification of the surface with amino groups, the amino groups can accept protons and become positively charged $NH_3^+$ species. As such, a positive zeta potential is detected under acidic conditions. Under alkaline conditions, the zeta potentials of LS, EPS, and APS exhibit negative zeta potentials probably due to the dissociation of protons from the amino groups and the residual silanol (Si—OH) groups form —$NH_2$ and Si—O$^-$ species.

A key comparison is between the APS and DPS functionalized silica. As depicted in the graph of FIG. 5, DPS changes the Zeta potential more readily at alkaline conditions while APS is more effective at acidic conditions. Across the pH range of 4-8, the shift in zeta potential was relatively low (e.g., ~15 mV). This key difference under conditions of extreme pH reflects the importance of the relative position of functional groups for the APS and DPS formulations shown in FIG. 4. APS amino groups are end groups that protonate to form —$NH_3^+$ whereas the DPS formula includes multiple —$NH_2^+$ functional groups within the silica matrix. These two sites have different titration features and different affinities for negatively charged viruses. The ionizable groups on the outer surface of the microorganism include carboxylic acids, organophosphates, amine, and sometimes sulfate moieties. Multiple $NH_2^+$ sites on the functionalized silica offer multiple hydrogen bonds for the functional groups on the surface of the virus particle, including carboxylic acids (—COOH). Because the hydrogen bond is a weaker intermolecular reaction, viruses captured by hydrogen bonding are more readily released.

The zeta potentials of bacteriophage MS-2 (pH 7.3 TSB) and bacteriophage PRD-1 (pH 7.6 TSB) were measured as −11.27 mV and −8.58 mV, respectively, reflecting the negative charges of these viruses' aqueous solutions at neutral pH. The observed negative zeta potential is consistent with the isoelectric point (pI) of MS-2 previously determined as 3.9 (Zinder, N. D. (Ed.) RNA Phages, Cold Spring Harbor Laboratory, New York, USA 1975, pp. 7-8). Because the pI of MS-2 falls below the pH of neutrality, the net charge on the outer surface of bacteriophage MS-2 is negative. Based on these zeta potential measurements, the amino-functionalized silica can possess an opposite charge from the virus and hence electrostatic attractions between the functional groups and the virus particles can be harnessed as a trapping or capturing mechanism.

Figure 6:
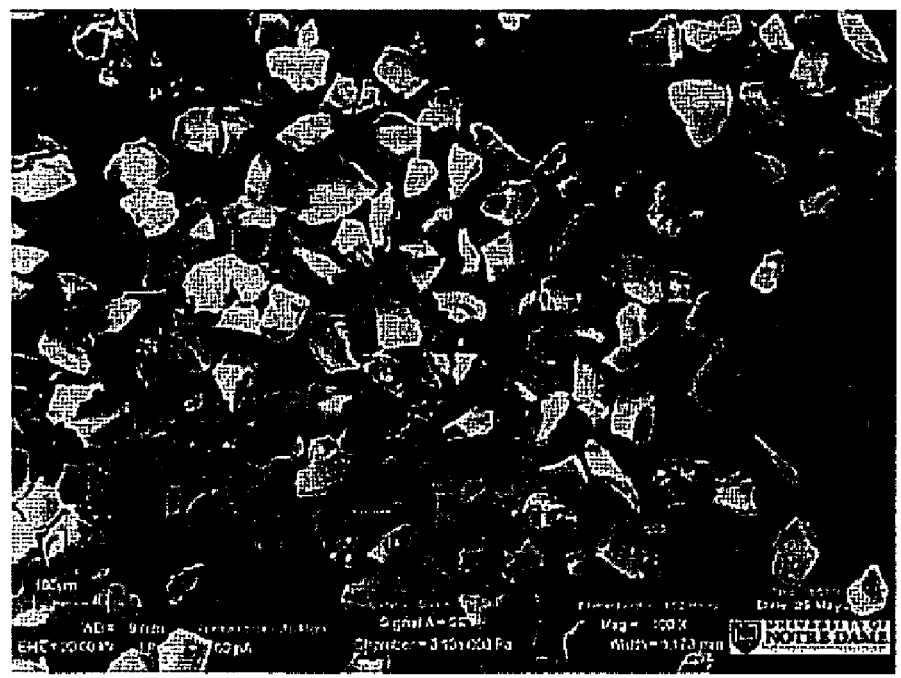
FIG. 6 depicts a scanning microscopy image of example silica particles.
Figure 7:
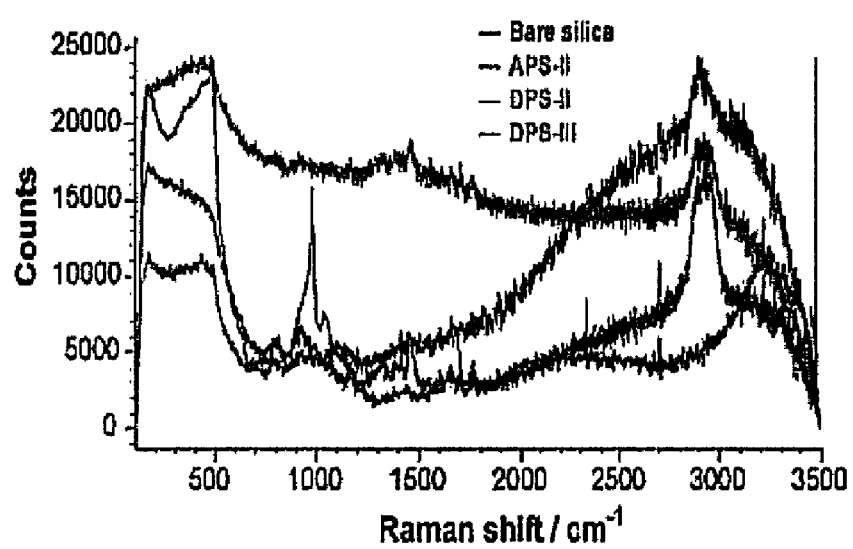
FIG. 7 is a graphical depiction of a Raman spectrum of amino-functionalized silica of FIGS. 4 and 5.

The morphology of the silica particles was studied by scanning electron microscopy (SEM). As shown in FIG. 6, the shapes of the silica particles are not uniform, and particle sizes ranged from approximately 50 to 100 micrometers with a distinct, non-porous surface. A graphical depiction of the Raman spectra of the bare silica and the amino-functionalized silica are presented in FIG. 7 (Laser: 633 nm, Grating: 1800 lines/mm, Exposure time: 10 s, Accumulations: 10 times). According to the observed spectral shifts, functionalization of the bare silica resulted in a shift of peak absorbance from around 2000 $cm^{-1}$ to 2900 $cm^{-1}$ for both the APS and DPS formulations. When the functionalized silica bead constructs were challenged with model viruses, the intensity of the observed spectral peaks decreased, indicating an interaction between the functionalized amino groups and the coliphage particles.

Capture and Release of Virus Using Amino-Functionalized Silica

Table 1 shows the change in zeta potential exhibited by silica particles before and after virus capture. Because the bare silica preparations exhibit a negative charge, the bare silica (i.e., the nonfunctionalized silica) were ineffective in binding the negatively charged virus particles; the negligible shifts in zeta potential following challenge either with coliphage MS-2 or PRD-1 were consistent when bare silica was challenged with coliphage. However, the zeta potentials of the APS and DPS constructs changed appreciably from positive to negative values following virus capture with both model microorganisms. This is consistent with the high efficiency virus binding that was observed with the two model coliphages (95.5-99.8%, Table 2) based on the intermolecular electrostatic attraction and specific interactions such as hydrogen bonding between the viruses and functionalized amino groups.

TABLE 1

Zeta potential of functionalized silica particles following virus capture

| Type of Particle | Before | After capture (MS2) | After capture (PRD1) |
| --- | --- | --- | --- |
| Bare silica | −35.55 | −36.77 | −28.97 |
| APS | 9.18 | −26.34 | −5.4 |
| DPS | 22.32 | −12.88 | −0.5 |

Zeta potential of viruses in TSB; MS2: −11.7 mV, PRD1: −8.58 mV.

Figure 8A:
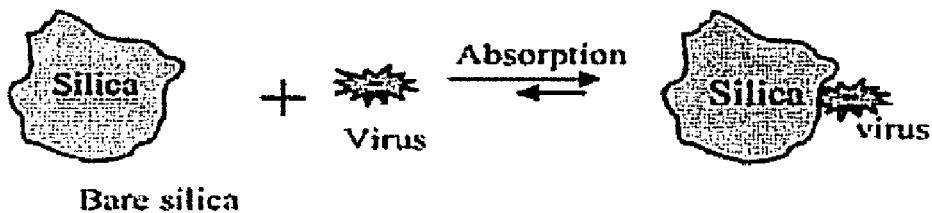
FIGS. 8A-8D are schematic illustrations of suggested models of virus capture on the example amino-functionalized silica of FIGS. 4 and 5.
Figure 8B:
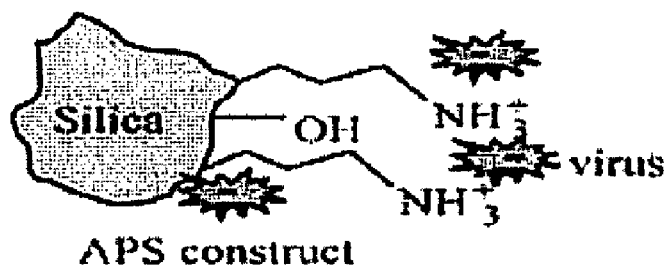
Figure 8C:
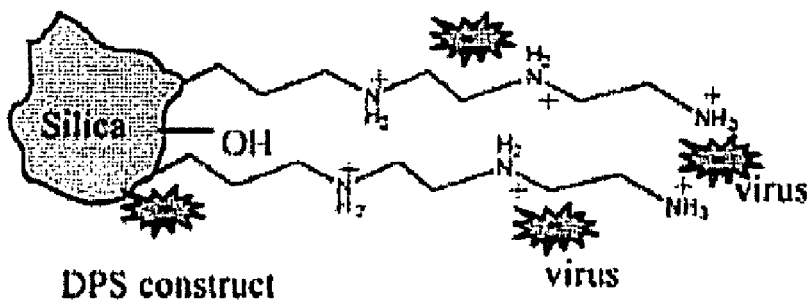
Figure 8D:
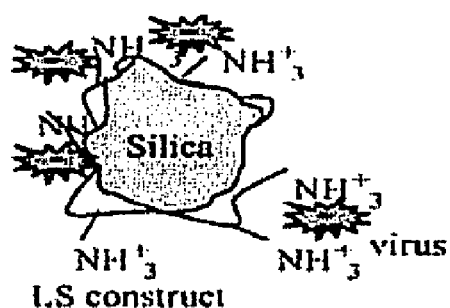

Tables 2 and 3 show the capture and release efficiencies of the amino-functionalized silica substrates, respectively. FIGS. 8A-8D illustrates schematic illustrations of several suggested models of virus capture on the amino-functionalized silica substrates. Referring to FIG. 8A, the bare silica exhibited poor virus binding efficiency (e.g., 9~13%) due to electrostatic repulsion between the negatively charged virus surface and the negatively charged silanol groups following dissociation of a proton. The small level of virus capture observed (e.g., ca. 10%) may have been associated with physical adsorption of virus onto the silica surface as shown in FIG. 8A, or failure to wash away residual viruses from the aqueous supernatant. The high efficiency of virus capture observed for the APS, DPS and LS constructs (>98%, Table 2) were caused by high density of positively charged amino groups, facilitating electrostatic attraction and other intermolecular interactions like hydrogen bonds, as depicted in FIGS. 8B-8D.

TABLE 2

Capture efficiency of virus

| Sample | Capture efficiency MS2 | Capture efficiency PRD1 |
| --- | --- | --- |
| Bare silica | 13.3 ± 15.1 | 9.0 ± 12.3 |
| APS II | 99.8 ± 0.5 | 95.5 ± 3.3 |
| DPS II | 98.0 ± 1.6 | 95.3 ± 3.0 |
| Lupamin Si | 99.5 ± 0.6 | 99.0 ± 0 |

TABLE 3

Release efficiency of virus with 1.5% beef extract supplemented with 0.25M glycine and 0.01% Tween 80

| Sample | Release efficiency MS2 | Release efficiency PRD1 |
| --- | --- | --- |
| Bare silica | 3.9 ± 0.8 | 6.3 ± 3.7 |
| APS II | 4.0 ± 1.4 | 69.5 ± 3.5 |
| DPS II | 79.0 ± 10.7 | 31.9 ± 16.2 |
| Lupamin Si | 0 ± 0 | 21.0 ± 1.4 |

Although the virus capture efficiencies of the three silica constructs were comparable, their capacities to release bound viruses were quite different (See Table 3). Binding between coliphage MS-2 and the APS construct was essentially irreversible (e.g., 4% of captured viruses could be released). However, interactions between this construct and coliphage PRD-1 could be readily reversed (e.g., ~70% of bound viruses could be released). Conversely, the coliphage MS-2 could be recovered readily from the DPS construct, whereas release of coliphage PRD-1 was relatively low (e.g., ~32% of bound viruses could be recovered). Recoveries of model viruses from the Lupamin construct were intermediate, ranging from essentially zero (MS-2) to ~21% (PRD-1).

These results show that there are differences in the interactions between the model viruses and the different types of functionalized silica. A number of potential capture mechanisms are suggested in FIGS. 8A-8B. As shown in FIG. 8D, Lupamin (LS) is a long linear polyvinylamine, which is likely to manifest itself as an entangled conformation on silica surface (Viogt, I.; Simon, F.; Estel, K.; Spange, S *Langmuir* 2001, 17, 3080-3086). The thicknesses of the charged double layer in 1 mM and 100 mM KCl aqueous solutions are calculated to be 10 nm and 1 nm, respectively (Brookhaven Instruments Corporation, Zeta Potential Analyzer Instruction Manual, P. 26). The length of a single carbon bond is known to be 0.154 nm. The positively charged multiple amino groups on the surface of the silica and the virus capsid are hence likely to be surrounded by a double layer cloud.

When protein-rich eluents are utilized to release or sever the connection between bound viruses and charged silica surfaces, this double layer 'screening' may eliminate the attractive force between suspended proteins and the silica-virus complex. As a result, virus binding cannot be readily reversed by substituting the virus binding site on the silica with a protein or surfactant molecule. The weaker PRD-1 charge density relative to MS-2 (−8.58 mV vs. −11.27 mv) suggests that PRD-1 may be more readily substituted and released at each binding site. This is indeed true for the APS functionalized bead but not so for the DPS construct. The weaker hydrogen bonding between $NH_2^+$ groups on the DPS and the charged carboxylic acid groups on the virus surface would also suggest easier release of the virus.

The same reason would argue that DPS would exhibit the highest release efficiency for coliphage PRD-1. While a high release rate for this combination was observed (See Table 3), the efficiency of release was approximately 50% of that observed for PRD-1 on the DPS construct. The reduction in release efficiency may have resulted because viruses bound by multiple interactions may be more difficult to reverse than those bound by single intermolecular reactions. For example, the DPS construct includes $NH_2$ sites on DPS that may exhibit comparable lengths with the —COOH and —$NH_2$ sites on the surface of the model coliphage (PRD-1) to the extent that multiple binding sites may be involved with each virus adsorption "event." DPS exhibited the highest release efficiency for coliphage MS-2 (Table 3), due to the extended length of the DPS functional group and its rigid conformation, which may facilitate an interaction that allows the group to protrude inside the double layer and attract the substituting proteins and surfactants by intermolecular interactions, as illustratively depicted in FIG. 8C.

Release of Virus from Silica Substrate with Elution Solutions

Typically, beef extract-based virus elution solutions are used to release viruses. Beef-extract elution solution may be modified to include surfactants and additional amino acids to adjust the zeta potential and improve the virus release efficiency. Following the initial characterization of the virus binding properties of each silica matrix, the effects of the modified eluants upon the release efficiency of coliphage MS-2 using the APS construct were examined. The following eluants were examined: 1.5% beef extract, 3.0% beef extract, defined amino acids including 0.5M glycine and 0.5M lysine, and surfactants such as 0.1% cetyltrimethylammonium bromide (CTAB), 0.1% sodium dodecylsulfate (SDS), and 0.01% polysorbate (Tween 80). All combinations of eluant components studied exhibited poor elution efficiency (less than 4.5%) for coliphage MS-2 captured on the APS construct. As indicated in FIG. 4 and FIG. 8B, the aminopropyl group (APS) is relatively short and the captured MS-2 particle is screened by the double layer ion cloud such that the protein and surfactants cannot be attracted to the sites on the functional group to release the captured virus. Conversely, the APS construct has only a single —$NH_3^+$ group, which lacks multiple hydrogen bonding mechanism, thus, resulting in low release efficiency.

The higher release efficiency of bacteriophage MS-2 exhibited by the DPS II construct was associated with the longer 3-(diethylenetriamino)propyl group that may protrude inside the double layer and offer multiple $NH_2$ sites for weaker hydrogen bonds. Among the elution solutions examined, 1.5% beef extract was the most essential component of the elution solution. When eluants were supplemented with 0.1% CTAB, elution efficiencies decreased. The addition of both 0.1% anionic surfactant (SDS) and 0.01-0.1% nonionic surfactant (Tween80) improved release efficiencies. However, increasing the concentration of surfactant beyond 0.01% did not improve virus recoveries significantly. Use of defined component eluants (either lysine or glycine) did not result in efficient release of model viruses with the exception of 0.5M lysine supplemented with 0.01% Tween 80.

The substitution of 0.25M glycine (Gly) and 0.25M threonine (Thr) for the primary eluent component (beef extract) resulted in a 42% virus release efficiency. Thus, the beef extract may be removed from the eluent altogether, rendering the concentrates much more compatible with PCR-based assay techniques which otherwise may be inhibited substantially by the abundance of nucleic acids of calf origin arising from the beef extract-rich solutions. The highest release efficiency observed with these eluents (79%) was observed when 1.5% beef extract was supplemented with 0.25M glycine and 0.01% Tween 80. Similar release characteristics were observed for bacteriophage PRD-1, where the elution efficiencies ranged from 30 to 43.5%.

pH Effect on the Capture Efficiency

Figure 9:
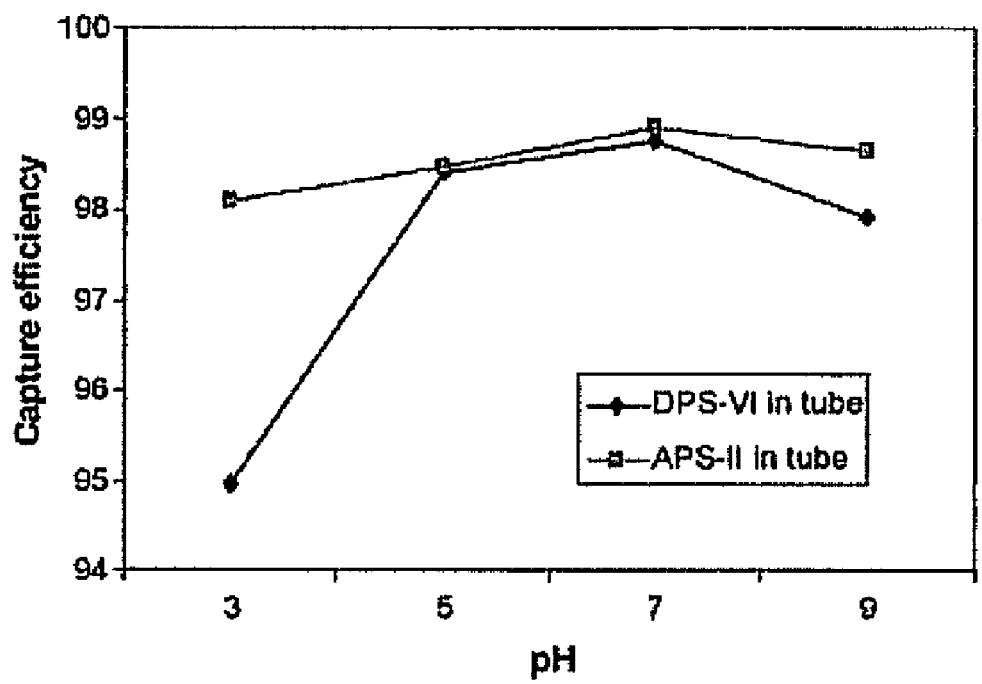
FIG. 9 is a graphical depiction of the pH effect on capture efficiency of example DPS and APS amino-functionalized silica.

Since the pH levels of field samples varies considerably, it is important to determine the efficiency of virus capture using functionalized silica across a range of pH values. FIG. 9 is a graphical depiction of the pH effect on capture efficiency of example DPS and APS amino-functionalized silica (spiked concentrations of MS-2: $9.0 \times 10^3$ to $4.7 \times 10^4$ pfu/ml for DPS-VI and APS-II in tube, 740-887 pfu/ml for DPS-VI in a column, and $2.9 \times 10^5$ to $1.1 \times 10^6$ pfu/ml). The results illustrated in FIG. 9 indicate that functionalized silica constructs DPS-VI and APS-II capture viruses very efficiently from pH 3 to 9. Overall, more than 98% of the seeded viruses were captured between pH 5 and pH 7. The highest capture efficiency was achieved at pH 7. Even at pH 9, both constructs exhibited capture efficiencies of approximately 98%. Under extremely acidic conditions (e.g., a pH level of 3), the zeta potential is very high (See FIG. 2) which suggests that the functionalized silica exhibits a high density of positive charge. However, as the isoelectric point (pI) of MS2 is 3.9 (Zinder, N. D. (Ed.) RNA Phages, Cold Spring Harbor Laboratory, New York, USA 1975, pp. 7-8), when ambient pH levels fall below the pI, some of functional groups on the virus capsid exhibit positive charge, resulting in a decreased capture efficiency.

Although viruses tend to be positively charged under extremely acidic conditions (i.e., pH<3), the functionalized silica still exhibited a high capture efficiency, suggesting that the capture mechanism includes not only electrostatic attraction but also other multiple intermolecular interactions such as hydrogen bonding. At pH 9 and higher, although the virus particles exhibit higher negative charges, the density of positive charge of functionalized silica is lower compared to acidic conditions. Hence, the capture efficiency is decreased at pH 9 compared to neutral conditions such as pH 5-7. As the ionizable groups on the virus surface are carboxylic acids, organophosphates, amines, and sometimes sulfate moieties, they can offer multiple point-specific interactions such as hydrogen bonds to functionalize amino groups on the surface of silica.

Capacity Of Virus Capture

Figure 10:
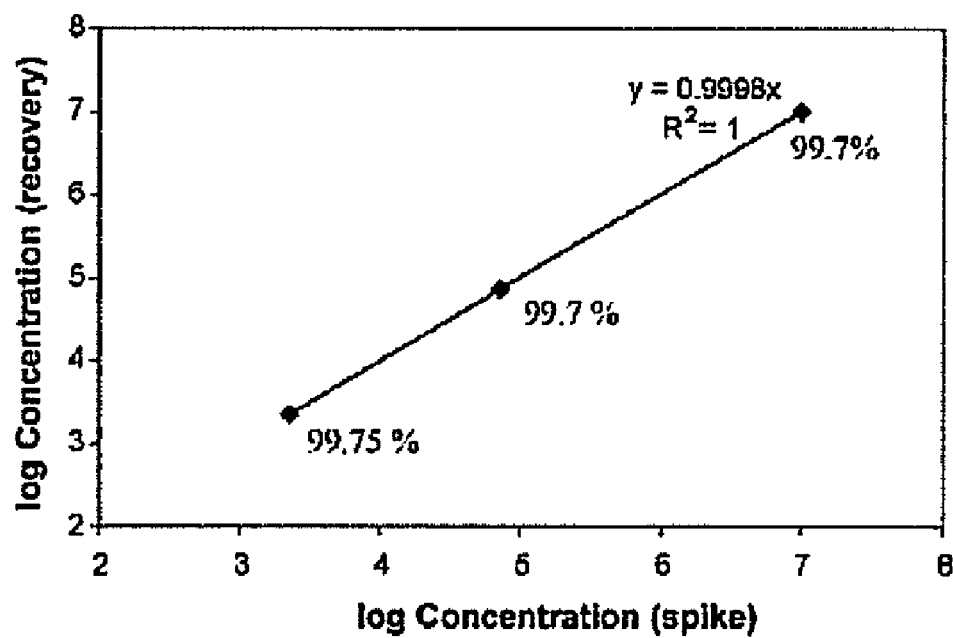
FIG. 10 is a graphical depiction of the correlation between spiked and recovered concentrations of virus MS-2.

It is important to understand the capture capacity under a wide range of virus concentrations for applying functionalized silica to field samples. To determine capture efficiencies across a range of virus concentrations, $10^3$, $10^4$, and $10^6$ pfu of viral particles were seeded into 1 ml volumes of reagent water in microcentrifuge tubes. Viruses were captured by DPS-VI and released using 1.5% beef extract/0.25M glycine/0.1% tween80 at pH9.0. FIG. 10 is a graphical depiction illustrating the correlation between spiked and recovered concentrations of virus MS-2.

Referring to FIG. 10, DPS-VI was capable of capturing 99.7% of the viruses seeded regardless of the spiking concentrations. These results demonstrate that the capture capacity of the functionalized silica material is more than sufficient to accommodate the range of virus concentrations that may be expected in natural waters. The good linear relationship between the concentrations of spike and recovery indicates that captured virus on the functionalized silica media can be dynamically released by a specific elution solution.

The example methods and apparatus described herein provide an effective microbe particle capture apparatus that includes amino-functionalized silica materials to capture microbe particles (e.g., virus particles) from fluids (e.g., water samples). The example methods and apparatus described herein may filter fluid and/or provide concentrated solution compatible with assay procedures using, for example, elution solutions. The example amino-functionalized silica materials include positively charged materials such as, for example, aminopropyl materials (e.g., APS, DPS, EPS, LS) that can capture virus with efficiencies exceeding 95%.

Because the 3-(diethylenetriamino)propyl group in the DPS construct relies upon hydrogen bonding with virus particles, these relatively weak interactions are more readily broken for efficient release of captured viruses. For example, the recoveries for bacteriophage MS-2 were 79% and the recoveries for PRD-1 were 32% when captured on DPS and released using elution solutions containing 1.5% beef extract, 0.25 M glycine and 0.01% Tween 80. The functionalized silica substrates are capable of capturing viruses quite efficiently across a wide range of virus concentrations and pH values. Additionally or alternatively, as viruses have long been very challenging to concentrate, the functionalized silica materials may be tailored towards a wide variety of virus filtering and concentration applications. Thus, for example, the amino-functionalized silica particles described herein may be applied to concentrate viruses in water samples with a wide range of pHs and virus densities.

Although certain methods and apparatus have been described herein, the scope of coverage of this patent is not limited thereto. To the contrary, this patent covers all methods and apparatus fairly falling within the scope of the appended claims either literally or under the doctrine of equivalents.

What is claimed is:

1. A method of capturing and releasing a viruses comprising:
    providing a 3-(ethylenediamino)propyl surface (EPS) functionalized silica substrate;
    contacting a fluid with the EPS functionalized silica substrate;
    capturing the viruses with the EPS functionalized silica substrate as the fluid contacts the EPS functionalized silica substrate;
    releasing the virus particle from the EPS functionalized silica substrate using an elution solution comprising threonine, glycine, lysine, cetyltrimethylammonium bromide, sodium dodecylsulfate, and polysorbate; and
    recovering the eluted material.

2. The method as defined in claim 1, further comprising analyzing the recovered eluted material concentrated with the viruses.

3. The method as defined in claim 2, wherein analyzing the recovered concentrated eluted material comprises using an enzyme-based, a cell culture infectivity-based, or a nucleic acid-based assay procedure.

4. The method as defined in claim 1, wherein the EPS functionalized silica substrate are beads.

5. The method as defined in claim 1, wherein contacting the fluid with the EPS functionalized silica substrate comprises passing the fluid over the EPS functionalized silica substrate.

6. The method as defined in claim 1, wherein the fluid is a water sample.

7. The method as defined in claim 1, wherein the viruses comprise MS-2 or PRD-1 viruses.

8. The method as defined in claim 1, further comprising measuring a zeta potential to estimate a surface density of the EPS functionalized silica substrate.

9. The method as defined in claim 1, wherein the EPS functionalized silica substrate comprises chemically bonding [3-[(2-aminoethyl)amino]propyl]trimethoxysilane to a silica substrate.

10. The method as defined in claim 1, wherein the elution solution further comprises at least one of beef extract, amino acids, surfactants, or polysorbate.

11. The method as defined in claim 10, wherein the amino acids comprise approximately 0.5 M glycine, and approximately 0.5 M lysine.

12. The method as defined in claim 10, wherein the surfactants comprise approximately 0.1% anionic surfactant, and a range of approximately 0.01-0.1% non-ionic surfactant.

13. The method as defined in claim 12 wherein the anionic surfactant is at least one of sodium dodecylsulfate or cetyltrimethylammonium bromide.

14. The method as defined in claim 12, wherein the non-ionic surfactant is polysorbate.

15. The method as defined in claim 1, wherein the elution solution comprises approximately 0.5 M glycine, approximately 0.25 M threonine, approximately 0.5 M lysine, approximately 0.1% cetyltrimethylammonium bromide, approximately 0.1% sodium dodecylsulfate, and approximately 0.01% polysorbate.

16. A method of capturing and releasing a viruses comprising:
    providing a 3-(diethylenetriamino)propyl surface (DPS) functionalized silica substrate;
    contacting a fluid with the DPS functionalized silica substrate;
    capturing the viruses with the DPS functionalized silica substrate as the fluid contacts the DPS functionalized silica substrate;
    releasing the virus particle from the DPS functionalized silica substrate using an elution solution comprising threonine, glycine, lysine, cetyltrimethylammonium bromide, sodium dodecylsulfate, and polysorbate; and
    recovering the eluted material.

17. The method as defined in claim 16, further comprising analyzing the recovered eluted material concentrated with the viruses.

18. The method as defined in claim 17, wherein analyzing the recovered concentrated eluted material comprises using an enzyme-based, a cell culture infectivity-based, or a nucleic acid-based assay procedure.

19. The method as defined in claim 16, wherein the DPS functionalized silica substrate are beads.

20. The method as defined in claim 16, wherein contacting the fluid with the DPS functionalized silica substrate comprises passing the fluid over the DPS functionalized silica substrate.

21. The method as defined in claim 16, wherein the fluid is a water sample.

22. The method as defined in claim 16, wherein the viruses comprise MS-2 or PRD-1 viruses.

23. The method as defined in claim 16, further comprising measuring a zeta potential to estimate a surface density of the DPS functionalized silica substrate.

24. The method as defined in claim 16, wherein the DPS functionalized silica substrate comprises chemically bonding N-3-(trimethoxysilylpropyl)diethylenetriamine to a silica substrate.

25. The method as defined in claim 16, wherein the elution solution further comprises at least one of beef extract, amino acids, surfactants, or polysorbate.

26. The method as defined in claim 25, wherein the amino acids comprise approximately 0.5 M glycine, and approximately 0.5 M lysine.

27. The method as defined in claim 25, wherein the surfactants comprise approximately 0.1% anionic surfactant, and a range of approximately 0.01-0.1% non-ionic surfactant.

28. The method as defined in claim 27 wherein the anionic surfactant is at least one of sodium dodecylsulfate or cetyltrimethylammonium bromide.

29. The method as defined in claim 27, wherein the non-ionic surfactant is polysorbate.

30. The method as defined in claim 16, wherein the elution solution comprises approximately 0.25 M threonine, approximately 0.5 M glycine, approximately 0.5 M lysine, approximately 0.1% cetyltrimethylammonium bromide, approximately 0.1% sodium dodecylsulfate, and approximately 0.01% polysorbate.

31. A method of capturing and releasing a viruses comprising:
   providing a Lupamin surface (LS) functionalized silica substrate;
   contacting a fluid with the LS functionalized silica substrate;
   capturing the viruses with the LS functionalized silica substrate as the fluid contacts the LS functionalized silica substrate;
   releasing the virus particle from the LS functionalized silica substrate using an elution solution comprising threonine, glycine, lysine, cetyltrimethylammonium bromide, sodium dodecylsulfate, and polysorbate; and
   recovering the eluted material.

32. The method as defined in claim 31, further comprising analyzing the recovered eluted material concentrated with the viruses.

33. The method as defined in claim 32, wherein analyzing the recovered concentrated eluted material comprises using an enzyme-based, a cell culture infectivity-based, or a nucleic acid-based assay procedure.

34. The method as defined in claim 31, wherein the LS functionalized silica substrate are beads.

35. The method as defined in claim 31, wherein contacting the fluid with the LS functionalized silica substrate comprises passing the fluid over the LS functionalized silica substrate.

36. The method as defined in claim 31, wherein the fluid is a water sample.

37. The method as defined in claim 31, wherein the viruses comprise MS-2 or PRD-1 viruses.

38. The method as defined in claim 31, further comprising measuring a zeta potential to estimate a surface density of the LS functionalized silica substrate.

39. The method as defined in claim 31, wherein the LS functionalized silica substrate comprises chemically bonding polyvinylamine to a silica substrate.

40. The method as defined in claim 31, wherein the elution solution further comprises at least one of beef extract, amino acids, surfactants, or polysorbate.

41. The method as defined in claim 40, wherein the amino acids comprise approximately 0.5 M glycine, and approximately 0.5 M lysine.

42. The method as defined in claim 40, wherein the surfactants comprise approximately 0.1% anionic surfactant, and a range of approximately 0.01-0.1% non-ionic surfactant.

43. The method as defined in claim 42 wherein the anionic surfactant is at least one of sodium dodecylsulfate or cetyltrimethylammonium bromide.

44. The method as defined in claim 42, wherein the non-ionic surfactant is polysorbate.

45. The method as defined in claim 31, wherein the elution solution comprises approximately 0.25 M threonine, approximately 0.5 M glycine, approximately 0.5 M lysine, approximately 0.1% cetyltrimethylammonium bromide, approximately 0.1% sodium dodecylsulfate, and approximately 0.01% polysorbate.

46. A method of capturing and releasing a viruses comprising:
   providing a 3-aminopropyl surface (APS) functionalized silica substrate;
   contacting a fluid with the APS functionalized silica substrate;
   capturing the viruses with the APS functionalized silica substrate as the fluid contacts the APS functionalized silica substrate;
   releasing the virus particle from the APS functionalized silica substrate using an elution solution comprising threonine, glycine, lysine, cetyltrimethylammonium bromide, sodium dodecylsulfate, and polysorbate; and
   recovering the eluted material.

47. The method as defined in claim 46, wherein the elution solution comprises approximately 0.25 M threonine, approximately 0.5 M glycine, approximately 0.5 M lysine, approximately 0.1% cetyltrimethylammonium bromide, approximately 0.1% sodium dodecylsulfate, and approximately 0.01% polysorbate.

48. The method as defined in claim 46, further comprising analyzing the recovered eluted material concentrated with the viruses.

49. The method as defined in claim 48, wherein analyzing the recovered concentrated eluted material comprises using an enzyme-based, a cell culture infectivity-based, or a nucleic acid-based assay procedure.

50. The method as defined in claim 46, wherein the APS functionalized silica substrate are beads.

51. The method as defined in claim 46, wherein contacting the fluid with the APS functionalized silica substrate comprises passing the fluid over the APS functionalized silica substrate.

52. The method as defined in claim 46, wherein the fluid is a water sample.

53. The method as defined in claim 46, wherein the viruses comprise MS-2 or PRD-1 viruses.

54. The method as defined in claim 46, further comprising measuring a zeta potential to estimate a surface density of the APS functionalized silica substrate.

55. The method as defined in claim 46, wherein the APS functionalized silica substrate comprises chemically bonding (3-aminopropyl)triethoxysilane to a silica substrate.

* * * * *